United States Patent [19]

Tanaka

[11] 4,119,983
[45] Oct. 10, 1978

[54] SELF-CONTAINED INTERCHANGEABLE LENS CAMERA

[75] Inventor: Harumi Tanaka, Kobe, Japan

[73] Assignee: Minolta Camera Kabushiki Kaisha, Azuchimachi, Japan

[21] Appl. No.: 741,425

[22] Filed: Nov. 12, 1976

[30] Foreign Application Priority Data

Dec. 8, 1975 [JP] Japan .................. 50-165992
Dec. 8, 1975 [JP] Japan .................. 50-165993

[51] Int. Cl.² .............. G03B 3/00; G03B 13/02; G03B 13/10
[52] U.S. Cl. .................. 354/197; 354/222
[58] Field of Search ........... 354/195, 197, 198, 219, 354/221, 222; 355/55; 352/142; 350/183, 254, 39

[56] References Cited

U.S. PATENT DOCUMENTS

| | | | |
|---|---|---|---|
| 1,494,801 | 5/1924 | Pittman | 354/197 |
| 2,832,274 | 4/1958 | Lorenz | 354/197 |
| 2,943,549 | 7/1960 | Nerwin | 354/222 X |
| 3,882,520 | 5/1975 | Kamp et al. | 354/197 |
| 4,038,671 | 7/1977 | Schroder et al. | 354/197 |
| 4,038,673 | 7/1977 | Schroder | 354/197 X |

Primary Examiner—John Gonzales
Attorney, Agent, or Firm—Wolder, Gross & Yavner

[57] ABSTRACT

A self-contained multiple objective lens camera includes a pair of objective lenses and a manually operable mechanism for alternatively selectively positioning either of the lenses in registry with the camera photographic optical axis and the respective other lens offset from the axis. A manually operable distance setting device is located on the camera body and each lens includes a driven follower which adjusts the focus of the respective lens and is in and out of operable engagement with the setting device when the lens respectively registers with and is offset from the photographic optical axis. Accordingly, the optical axis registering lens is focussed in accordance with the presetting of the distance setting device and transfer of the lenses to optical axis registry without changing the distance setting focusses of the lenses when at the optical axis to the same distance.

23 Claims, 10 Drawing Figures

SELF-CONTAINED INTERCHANGEABLE LENS CAMERA

BACKGROUND OF THE INVENTION

The present invention generally relates to improvements in cameras having self-contained interchangeable photographic objective lenses and it relates more particularly to an improved camera containing interchangeable objective lenses of different focal lengths for example, a pair of telephoto and standard objective lenses or a pair of telephoto and wide angle objective lenses.

Cameras have heretofore been available and proposed which are provided with a pair of photographic objective lenses built into and self-contained in the camera and which are selectively employed in photographing depending on the desired field of view.

Among these types of cameras are the slidable type in which there is provided a mounting plate slidable in a direction at a right angle to the photographing or picture taking optical axis and having two taking or photographic objective lenses mounted thereon in parallel relation to each other, and the so-called turret type in which there is provided a mounting disc supported on a pivot parallel to the picture taking optical axis with two or more taking lenses mounting thereon, whereby upon interchanging one lens with another, the mounting disc is rotated through a given angle to bring a desired taking lens into the picture taking optical path (the so-called turret type). However, these types of cameras pose a problem in that upon taking a picture, focusing must be separately adjusted for each of the taking lenses, because the two taking lenses are so designed as to be focused individually. For instance, when an object at a distance of 5 meters is to be photographed by using two or more interchangeable taking lenses so as to take two or more pictures, then one lens is focused upon the object for photographing, after which the lens is interchanged with the other lens, followed by the focusing of the new lens to the object distance of 5 meters. This results in a complicated and highly time consuming operation. Thus, in the case an object moves fast, a photographing opportunity is frequently missed.

In addition, with the aforesaid prior art cameras, as two taking lenses are mounted on a plate in the manner that the rearmost portion of each lens does not lie in the rear of the plate, when they are housed within a camera body, with the two lenses placed in parallel with a picture optical axis, the length of a camera body must be increased by a length of at least the additional length of the lens having the longer focal length (a telephoto lens in the case of a combination of a telephoto lens and a standard lens), thereby increasing the size of the camera body.

In addition, with the aforesaid prior art cameras, as the respective taking lenses are focused individually, it often occurs that either of the lenses are moved from its operative to its retracted or rest position with the lens being in a condition adjusted to a focus on an object at a short distance, i.e., in the condition where the lens is extended and of maximum increased length. As a result, a large space must be provided in the camera body for the accomodation of the lenses without shortening the extended lens.

SUMMARY OF THE INVENTION

It is an object of the present invention to provide an improved camera equipped with two taking or photographic objective lenses selectively positionable in the camera photographing optical path and in which focus of the selected operable lens is adjustable by a single common adjusting member.

It is another object of the present invention to provide an improved self-contained multiple lens camera wherein each lens upon being positioned in a photographing or operating position is automatically set to the focusing condition to which a common focusing member has been set.

It is another object of the invention to provide an improved self-contained multi-lens camera equipped with a lens interchanging device, in which in case two or more pictures are to be taken of an object at the same distance with different lenses, once a distance-setting operation is performed, there is no need for a subsequent focusing operation for the other lens, and in which the aforesaid distance adjusting operation is simple and may be quickly carried out, thereby allowing photographing of an object which is fast moving without missing a photographing opportunity.

It is a further object of the present invention to provide an improved camera equipped with a lens interchanging device, in which two taking lenses may be housed within the camera body, with the space required for a long focus objective lens being minimized, thereby providing a highly compact camera body.

It is yet a further object of the present invention to provide an improved camera equipped with a lens interchanging device, in which two taking lenses having different focal lengths may be housed within the camera body, and which may minimize the overall length of a long focus taking lens, when the long focus taking lens is retracted from the picture taking optical path, thus allowing a further decrease in the size of the lens housing portion, with a resulting decrease in the overall size of the camera body.

BRIEF DESCRIPTION OF THE DRAWINGS

FIG. 2 (a) is a view similar to FIG. 1(a) but with another objective lens in operative position;

FIG. 2 (b) is a plan view thereof;

FIG .4 is a perspective view of still another embodiment of the present invention;

DESCRIPTION OF THE PREFERRED EMBODIMENTS

Referring now to the drawings, more particularly FIGS. 1(a) to 2(b) thereof which illustrate a preferred embodiment of the present invention, a camera is provided with two photographic objective or taking lenses having different focal lengths, for example, a long focus taking lens 1 for telephotography and another taking lens 2 such as a standard lens is adapted for ordinary photography. A pivot 3 extending perpendicular to the camera picture taking optical path is carried on the camera body or a fixed base plate. A supporting member 4 having two arms extending or bifurcated into a 'V' shape is swingably supported by the pivot 3 at the elbow of the member 4. The respective taking lenses are mounted on the ends of the respective arms in a focus adjustable manner. The optical axes of the taking lenses 1, 2 are directed radially from the pivot 3. Thus, when one of the taking lenses 1, 2 is set on the picture taking optical path, the optical axis of the lens is brought into alignment with the axis of the picture taking optical path. In addition, the long focus taking lens 1 has a helicoid ring resiliently urged so as to rotate in a clockwise direction under the action of a spring 5, while the short focus taking lens 2 as well has a helicoid ring urged by a spring 6 so as to rotate in a counter-clockwise direction.

A focusing member 7 is adapted to adjust the focusing of a respective lens 1, 2 when such taking lenses 1, 2 is selectively set in the picture taking path, and the member 7 is laterally slidably mounted on the camera body. An operating member 7a affixed to the focusing member 7 registers with a distance scale piece 8 secured to the camera body in a click-stop fashion and may be locked at a desired distance index. The focusing member 7 is formed with control portion 9a, 9b at the inner end of the member 7 and the control portions 9a, 9b constitute a control member 9.

Driven portions or followers 1a and 2a such as pins are anchored to and project radially outward from the helicoid rings provided on the long focus taking lens 1 and standard taking lens 2, the driven portions 1a, 2a being urged or biased by springs 5, 6 in one direction, respectively. Thus, when one of the taking lenses 1, 2 is set on its picture taking path, the respective driven portion 1a or 2a will engage the corresponding control portion 9a or 9b of the control member 9 so as to rotate the helicoid ring in a manner that the taking lens 1 or 2 positioned on the camera picture taking path is focused at an object distance determined and indicated by the focusing member 7.

Figure 2A:
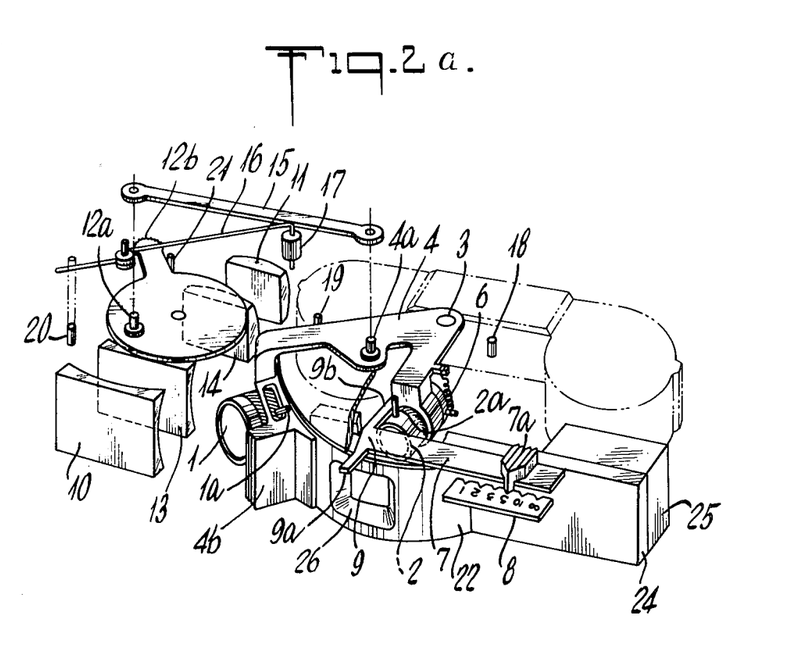
Figure 2B:
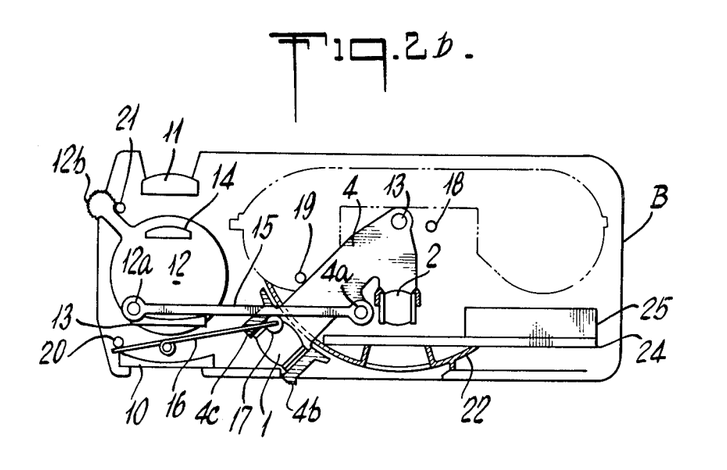

A finder optical system is provided which is of an inverted Galilean finder type and includes an objective lens 10 and eyepiece 11. In this respect, the magnification of a field image obtained through the lenses 10, 11 is so pre-set as to match with the picture taking magnification afforded by the long focus taking lens 1. A horizontal lens mounting disc 12 is positioned above the lenses 10, 11 and is turnable through an angle of about 90°. A concave lens 13 and a convex lens 14 are diametrically mounted oppositely on and depend from the lens mount 12, thereby forming an afocal optical system. In this respect, the magnification of a field image obtained through respective lens groups 10, 11, 13, 14 is so pre-set as to match the picture taking magnification or field of the standard taking lens 2 by positioning the lens group 13, 14 on a finder optical path, as shown in FIG. 2.

A pin 4a projecting upwardly from the supporting member 4 is connected to the pin 12a projecting upwardly from the lens mounting disc 12 by an elongated connecting piece or link 15, so that the supporting member 4 rotates in cooperation with the lens mounting disc 12. A click roller 17 is urged against the connecting piece 15 under the action of a spring 16, thereby permitting the selection between a standard position and a telephoto position in a click or toggle fashion. Stops 18, 19, 20 and 21 are located on the camera body or base plate for limiting the rotational movements of supporting member 4 and lens mounting disc 12.

Inside of the path of the movement of the supporting member 4c for the long focus taking lens, a dust preventive cover wall 22 is formed of arcuate shape along the path of the supporting member 4c in order to protect the camera interior parts and mechanism against dust. A space 23 is formed between the cover wall 22 and the front wall of the camera casing so that the long focus lens 21 may be accomodated in the space when the standard lens 2 is set in the photographic light path, i.e., in the operative position. Positioned interiorly of the dust preventive wall 22 is a shutter sector portion 24 and a shutter means 25.

Figure 1A:
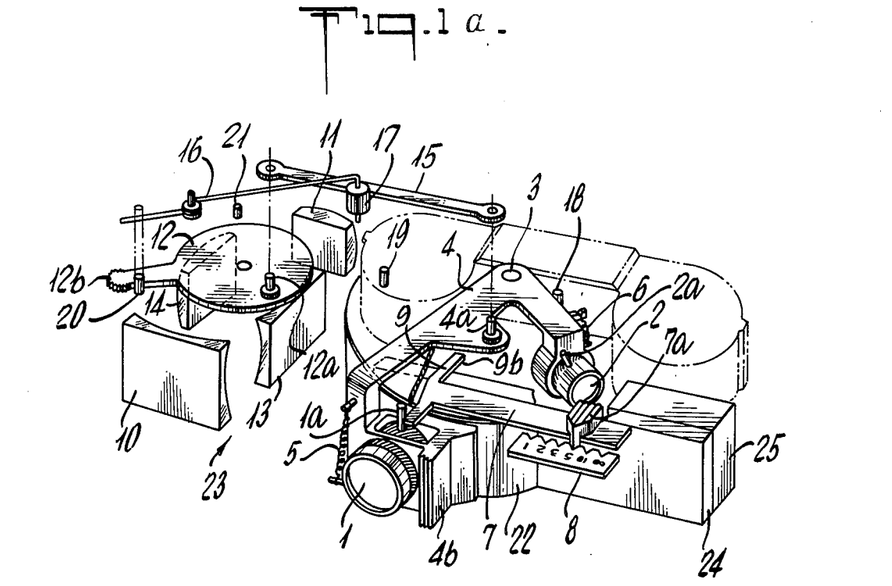
FIG. 1(a) is a fragmentary perspective view of a preferred embodiment of the present invention showing a first objective lens in operative position.
Figure 1B:
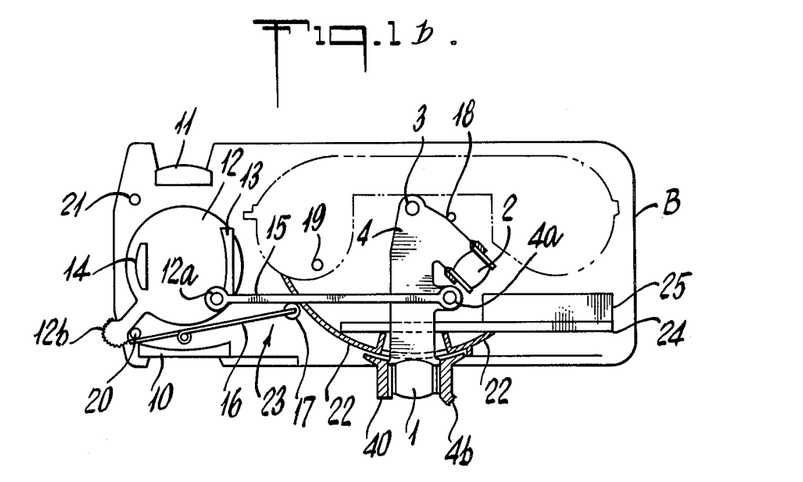
FIG. 1(b) is a plan view thereof.

FIG. 1 is a view showing the condition with the long focus taking lens 1 set on a picture taking path in which the driven portion 1a projecting from the helicoid ring engages the control portion 9a of the control member 9; the lens 1 being focused on an object at a object distance, say 5 meters, indicated by the focus adjusting member 7 and the afocal system lens groups 13, 14 which are mounted on the lens mounting disc 12 being positioned out of the finder optical path. Accordingly, the magnification or field of the picture taking system and that of the finder system are matched with each other so as to permit proper telephotography.

In order to exchange the long focus taking lens 1 with the standard taking lens 2, the operating portion 4b formed on the supporting member 4 or the operating portion 12b formed on the lens mounting disc 12 is manually rotated in the clockwise direction. As a result, the supporting member 4 and the lens mounting disc 12 are rotated in cooperation with each other by means of the link or connecting piece 15, thereby retracting the long focus taking lens 1 away from the picture taking optical path, and advancing the standard taking lens 2 into registry with the picture taking optical path, i.e., providing a condition where ordinary picture taking may be performed with the supporting member 4 and lens mounting disc 12 being held in position by means of stops 19, 21. Shown at 26 is a picture taking aperture provided in wall 22 on a picture taking optical path. At the same time, the standard lens 2 is transfered to operative position the afocal system lenses 13, 14 are set in position in the optical path of the finder optical system.

In the course of the interchange of the taking lens 1 with the taking lens 2, i.e. from the condition of FIG. 1 to that of FIG. 2, the driven portion 1a on the helicoid ring provided for the long focus taking lens 1 is disengaged from the control portion 9a of the control member 9, so that the helicoid ring is rotated in the clockwise direction under the action of the spring 5 to thereby bring the long focus taking lens 1 to its retracted position, after which the driven portion 2a on the helicoid ring provided for the standard taking lens 2 abuts or engages the control portion 9b of the control member 9 so as to rotate the helicoid ring in the clockwise direction against the action of the influence of spring 6 to axially advance the lens 2 toward its extended position, so that the standard taking lens 2 may be automatically focused to an object distance of 5 meters, which as been set at the time of focusing of the long focus taking lens 1. In other words, upon interchange of one lens with another, the change-over of the finder optical system may be effected so as to provide magnifications matched with each other, thus allowing the ordinary picture taking of the object without any further focusing operation. When the standard lens 2 is set in the operating position as mentioned above, the telephoto lens, i.e., long focus lens is accomodated in the space 23 within the camera casing, with the operating portion 4b of the lens supporting member 4 blocking up the lens.

Furthermore, upon interchange of the standard taking lens 2 with the long focus taking lens 1 as well, the operations similar to the aforesaid operations are carried out, the rotating directions of rotatable members however, being reversed. The positional relationship of the control portion 9a to the control portion 9b of the control member 9 is such that the respective taking lenses may be focused to the same object distance upon interchange of the lenses within an allowable object distance which is used in common for both the long focus taking lens 1 and the standard taking lens 2.

Figure 3:
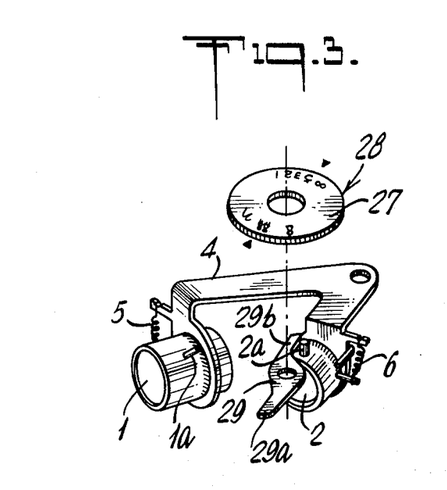
FIG. 3 is a perspective view showing essential parts of another embodiment of the present invention.

Referring now to FIG. 3 which is a view of essential parts of another embodiment of the invention, a focusing member 27 which is externally accessible is provided separately of a control member 29 and coupled thereto either directly or through a speed reducing transmission in a manner that the both members 27, 29 may be rotated at the same angular rate or at a given ratio through the medium of a shaft, (not shown). An object distance is indicated on a scale 28. Thus, in the present embodiment, the members 27, 29 need not necessarily be integral with each other. The control member 29 is formed with oppositely directed arms or control portions 29a, 29b which are provided for adjusting the driven portions or followers 1a, 2a respectively on the helicoid rings for the respective taking lenses 1, 2. Thus, when the lens interchange is performed as in the case of the mechanism of FIGS. 1 and 2, with the focusing member 27 being set to a given object distance beforehand, then the taking lens selected may be focused to the aforesaid object distance automatically.

Figure 4:
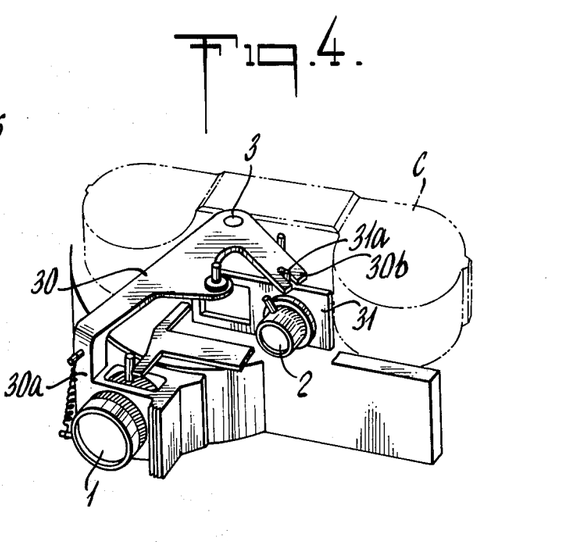
Figure 5:
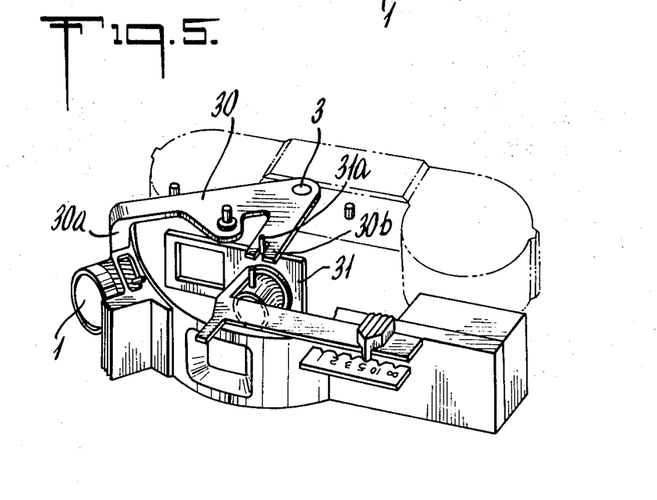
FIG. 5 is a perspective view showing the condition of the embodiment of FIG. 4 after the exchange of lenses.

In the embodiment of the invention shown in FIGS. 4 and 5, a long focus taking lens 1 is supported on a mounting section or supporting portion 30a forming a wing or tip portion of one of arms of V-shaped lens supporting member 30 whose elbow or root portion is supported by a pivot 3 affixed to the camera body (not shown), a focus-adjustable manner, with the optical axis of the taking lens 1 being directed radially of the pivot 3, while the other lens, for instance, an ordinary standard lens 2 is supported on a slidable mounting plate 31 which is slidably supported in the camera body. Taking lens 1 on the lens supporting member 30 may be turned through a given angle from its standard picture taking position, in which the picture taking optical axis of the taking lens 1 (FIG. 4) coincides with the camera photographing optical axis to a position retracted from the picture taking optical path (FIG. 5). A projection 31a on the slidable mounting base plate 31 is maintained in engagement with a fork portion 30b which terminates the other arm of the lens supporting member 30 so that the taking lens 2 moves in a direction at a right angle to the picture taking optical path with the transfer of lens 1 between its registering and offset positions relative to the photographing optical axis. In other ways the present embodiment is similar to that first described.

The above arrangement is particularly advantageous in avoiding the interference of the taking lens 2 with other members such as the wall of the film chamber, the wall of a film cartridge C and the like, when the taking lens having a relatively short focal length is so designed as to turn and hence assumes its angular position averted from a picture taking optical path.

Figure 6:
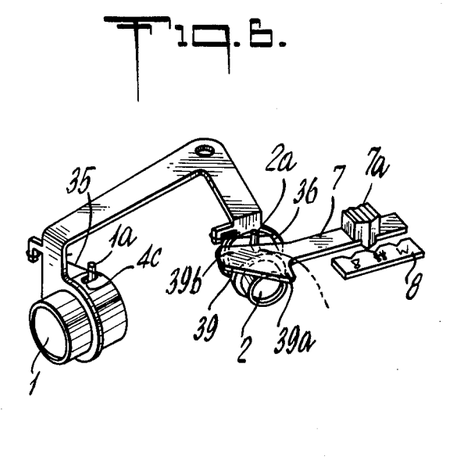
FIG. 6 is a perspective view showing essential parts of yet another embodiment of the present invention.
Figure 7:
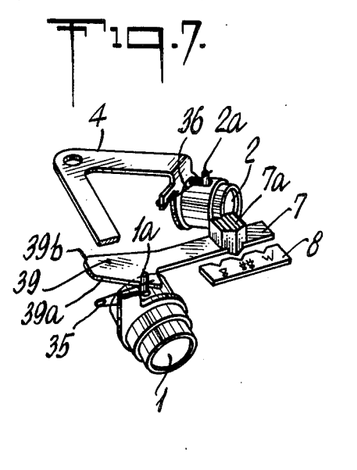
FIG. 7 is a perspective view showing the condition of the embodiment of FIG. 6 after exchange of lenses.

In the embodiment of the invention shown in FIGS. 6 and 7, the respective taking lenses 1, 2 are extended by the linear movements of the respective followers 1a and 2a rather than extended due to the rotation of the helicoids by the angularly moved followers.

More particularly, the taking lenses 1, 2 are axially slidingly supported on the outer end portions of the arms of the V-shaped supporting member 4 with their followers or driven portions 1a, 2a being in engagement with slots or elongated holes 4c, 4d provided in the collars or supporting portions which support lenses 1, 2. As a result, the respective taking lenses 1, 2 may be retracted or extended along the optical axis. A spring 35 acts on the driven portion 1a of the long focus taking lens 1 so as to urge the same to its axially retracted position, while a spring 36 acts on the driven portion 2a provided for the standard taking lens 2 so as to urge the same to its axially extended position.

Further, a control member 39 integral with the focusing member 7 is formed with opposite cam edges which define control portions 39a, 39b, which may engage the driven portions 1a, 2a of the respective taking lenses 1, 2 respectively, so that the respective taking lenses may be focused to a desired object distance shown by the distance scale 8.

Thus, when the standard taking lens 2 is set on the picture taking optical path as shown in FIG. 6 then the driven portion 2a for the taking lens 2 is brought into engagement with the control portion 39b of the control member 39, thereby automatically causing the standard taking lens 2 to be focused to an object distance indicated by the distance adjusting member 7. When the lens interchange is performed under the above condition as shown in FIG. 7, the standard taking lens 2, whose driven portion 2a has been disengaged from the control member 39, is brought to a given axially extended position under the action of the spring 36, while the taking lens 1 is axially extended due to the engagement of the driven portion 1a for the long focus taking lens 1 with the control portion 39a of the control member 39, so that the taking lens 1 may be automatically focused to the same object distance as that given in FIG. 6.

Figure 8:
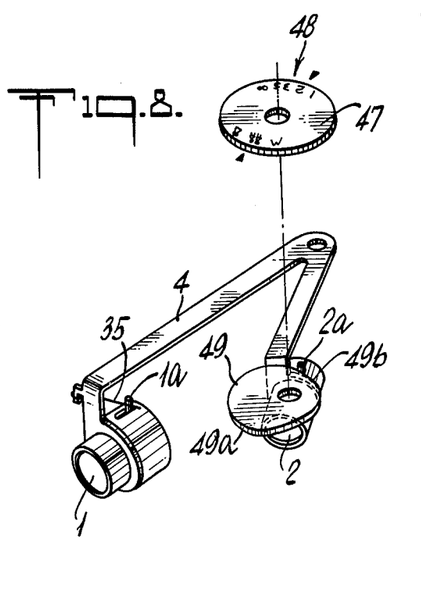
FIG. 8 is a perspective view showing an essential part of a further embodiment of the present invention.

FIG. 8 shows still another embodiment of a camera having linearly extending type taking lenses 1, 2. In this embodiment, a focusing member 47 is provided separately of a control member 49, the both of which may be rotated in cooperation with each other by the medium of a shaft or other drive coupling means, (not shown). When the distance adjusting member 47 is turned so as to indicate a desired object distance on a scale 48, then the control member 49 as well is rotated, thereby changing the angular positions of control portions 49a, 49b serving as cams thereby alternatively bringing either one of the taking lenses 1 and 2 to its control member predetermined extended position due to the driven portion 1a or 2a contacting the control portion 49a or 49b, so that the taking lens may be focused to a desired object distance. When the lens interchange alone is carried out under the above condition, then the taking lens interchange is automatically focused to the preset object distance.

While there have been described and illustrated preferred embodiments of the present invention, it is apparent that numerous alterations, omissions and additions may be made without departing from the spirit thereof.

I claim:

1. A camera equipped with a lens interchanging device comprising:

a camera body having a picture taking optical axis;

a first lens member having a movable first lens portion for adjusting the focus of said first lens member;

a first lens adjusting means provided on said first lens member and having a first driven portion which is movable so that said movable first lens portion may be moved in response to the movement of said driven portion, thereby adjusting the focus of said first lens member;

a first biasing means for biasing said first driven portion to a starting position;

a second lens member having a movable second lens portion for adjusting the focus of said second lens member;

a second lens adjusting means provided on said second lens member and having a second driven portion which is movable so that said second movable lens portion may be moved in response to the movement of said driven portion thereby adjusting the focus of said second lens member;

a second biasing means for biasing said second driven portion to a starting position;

a lens operating means retaining said first lens member and said second lens member and manually operable so that said lens members may be selectively set between a position offset from said picture taking optical axis and a position on said picture taking optical axis;

a manually operable distance setting member settable to a desired object distance for adjusting the focus of said lens members; and control means having a first cam portion cooperative with said first biasing means to control the position of said first driven portion in accordance with the setting of said distance setting member, and a second cam portion cooperative with said second biasing means to control the position of said second driven portion also in accordance with the setting of said distance setting member, said first and second cam portions being respectively brought into operative interconnection with the corresponding driven portion when the corresponding lens member is on said picture taking optical axis 2. A camera as set forth in claim 1 wherein said camera body is of flat rectangular parallelepiped form;

said first lens member includes a long focus taking lens having a relatively long focal length; and said second lens member includes a short focus taking lens having a relatively short focal length as compared with that of said long focus taking lens included in said first lens member.

3. A camera as set forth in claim 2 wherein said camera further includes a finder portion comprising:

fixed first finder optical elements which afford a finder magnification corresponding to the first lens member; and second finder optical elements which afford finder magnification for a second lens member in cooperation with said first optical elements when positioned in optically aligned registry with said first optical elements, said second optical elements being movable into or out of the optical path of said first optical elements, and cooperative with said lens operating means so as to be positioned in registry with said first optical elements, only when said second lens member is set on said picture taking optical axis.

4. A camera as set forth in claim 2 wherein said operating means comprises:

a first operating portion retaining said first lens member and moving said first lens member between a picture taking position on the picture taking optical axis in the front portion of a camera body and another position offset from said picture taking optical axis by turning said first lens member through a predetermined angle from said picture taking position, in a manner to be inclined to the picture taking optical axis;

a second operating portion moving said second lens member from a position offset from said picture taking optical axis to a position on the picture taking optical axis in cooperation with said first operating portion only when said first operating portion is turned through a given angle to its position averted from the picture taking optical axis.

5. A camera as set forth in claim 4 wherein said first biasing means includes spring means urging the first driven portion in the direction towards its axial retracted position so as to minimize the overall length of said first lens member when said driven portion is displaced from said control means.

6. A camera as set forth in claim 5 wherein there is provided a housing portion in the front portion of said camera body, said housing portion housing said first lens member in inclined relation to said picture taking optical axis, when said first lens member is in its position offset from said picture taking optical axis.

7. A camera as set forth in claim 6 wherein said camera body includes a dust preventive cover which is positioned closer to the surface of film loaded in said camera than said first lens member when said first lens member is set in its picture taking position, said cover including an arcuate surface extending along the path of movement of said first lens member.

8. A camera as set forth in claim 4 wherein first operating portion consists of a lever pivotally supported on a pivot extending at a right angle to a plane including said picture taking optical axis, and said second operating portion consists of a lever formed integrally with said first operating portion at a predetermined angle thereto, said lever retaining said second lens member in a position closer to the surface of film loaded in said camera than said first lens member, and moving said second lens member from a position offset from said picture taking optical axis into registry therewith due to the pivotal movement of said lever only when said first lens member is moved to a position offset from said picture taking optical axis.

9. A camera as set forth in claim 4 wherein said first operating portion and said second operating portion are provided with mounting portions for retaining said first and second lenses thereon, and said first and second lens adjusting means include extensible mechanisms including helicoid screws formed between said respective first and second movable lens portions coupled to respective first and second driven portions and said mounting portions.

10. A camera as set forth in claim 4 wherein said first operating portion and said second operating portion are provided with a mounting portion for retaining first and second lens members thereon and said first and second lens adjusting means consists of driven portions composed of pins coupled to said respective movable lens portions, and linear guide grooves provided in said respective mounting portions for guiding said pins linearly with said pins projecting through said mounting portions.

11. A camera as set forth in claim 10 wherein said control means comprises a cam member having said first and second cam portions and said cam member is cooperative with said distance setting manually operable member.

12. A camera as set forth in claim 4 wherein said first operating portion includes a first lever arm pivotally supported on a pivot extending in the direction perpendicular to a plane including the picture taking optical axis, and said second operating portion includes a second lever arm formed integrally with and at a given angle to said first lever arm and a mounting plate engaging with said second lever arm and slidable in the direction at a right angle to said picture taking optical axis, and said mounting plate retaining said second lens member in a position closer to the film surface than said first lens member, said second lever arm causing a sliding movement of said mounting plate so as to move said second lens member from a position offset from said picture taking optical axis to a position in registry therewith only when said first lens member is moved to a position offset from said picture taking optical axis.

13. A camera equipped with a lens interchanging device, comprising:
 a camera body having a picture taking optical path;
 a first lens member having at least a first movable lens portion for adjusting the focus of said first lens member;
 a first lens extensible mechanism for adjusting the focus of said first lens member by moving said first movable lens portion;
 a second lens member having at least a second movable lens portion for adjusting a focus of said second lens member;
 a second lens extensible mechanism for adjusting the focus of said second lens member by moving said second movable lens portion;
 a first lens operating member retaining said first lens member and turnable through a given angle for moving said first lens member between a picture taking position on said picture taking optical path in the front portion of a camera body, and a position displaced angularly from said picture taking optical path in an inclined relation to the axis of said picture taking optical path;
 an operating means cooperative with said first lens operating member and moving said second lens member from a position displaced from said picture taking optical path into registry with said optical path, only when said first lens member is moved to its position displaced from said picture taking optical path; and
 a housing portion provided in the front portion of said camera body and housing said lens within the bounds of said camera body, when said first lens member is moved to its position displaced from said picture taking optical path.

14. A camera as set forth in claim 13 wherein said first lens member has a relatively long focal length, and said second lens member has a relatively short focal length as compared with that of said first lens member.

15. A camera as set forth in claim 14 wherein said first and second lens extensible mechanisms are provided on said first operating member and said operating means and include mounting portions for retaining respective lenses thereon, driven members coupled to respective movable lens portions movable by means of said control means, a guiding mechanism positioned between a movable lens portion and said mounting member, for moving said respective movable lens portion along the optical axis of said corresponding lens, when said respective driven member is moved, said driven members being provided with spring means for urging said respective movable lens portions in a direction to mimimize the distance, said movable lens portion is normally extended.

16. A camera as set forth in claim 15 wherein said camera includes a finder portion comprising:
 a first optical element fixed in place for affording a finder magnification corresponding to that of said first lens member;
 a second optical element for affording a finder magnification corresponding to that of said second lens member in cooperation with said first optical element, said second optical element being cooperative with the movement of said second lens member and being positioned within said first optical element only when said second lens member is set on said picture taking optical path.

17. A camera as set forth in claim 16 wherein said operating means comprises:
 a lens mounting plate carrying said second lens member thereon and slidingly movable a predetermined distance in a direction at a right angle to said picture taking optical axis;
 a second operating member formed integrally with said first lens operating member and rotatable at a given angle to said first operating member when said first lens operating member is turned; and
 a transmission mechanism for converting the rotational movement of said second operating member into the sliding movement of said mounting plate and moving said second lens into or out of said picture taking optical path.

18. A camera as set forth in claim 16 wherein said lens operating means comprises a second operating member formed integrally with said first lens operating member at a given angle to said first lens operating member, said second operating member supporting second lens member and moving said second lens member from a position displaced from said picture taking optical path to a position registering with said path only when said first lens member has been moved to its position displaced from said picture taking optical path.

19. A self-contained multiple interchangeable objective lens camera comprising:
 a camera body having photographing optical axis;
 a pair of first and second objective lens members of relatively long and short focal lengths, each of said lens members including means provided with a focus adjusting follower for adjusting the focus of the respective lens member;
 transfer means supporting said lens members for selectively positioning either one of said lens members in registry with said photographing optical axis and the other of said lens members in a position displaced from said photographing optical axis; and
 manually adjustable focus control means located on said camera body and releasably operably engaging the follower of the focus adjusting means of the lens member registering with said optical axis for adjusting the focus of said optical axis registering lens member in accordance with the setting of said focus control means, said control means comprising manually adjustable cam means including concurrently movable first and second cam sections which alternatively engage the corresponding follower of a lens member registering with said optical axis.

20. The camera of claim 19 wherein said cam means includes a manually adjustable cam member including said first and second cam sections.

21. The camera of claim 20 wherein said lens members each include at least an axially movable lens focussing portion coupled responsive to the movement of a respective follower.

22. The camera of claim 21 including spring means resiliently biasing each of said lens focussing portions in a direction advancing a respective follower into engagement with a corresponding cam section when the lens member carrying said follower registers with said optical path.

23. The camera of claim 21 including spring means normally biasing the axially movable lens focusing portion of said long focal length lens member to its fully retracted position.

* * * * *